Aug. 22, 1967    H. M. BAUSERMAN    3,337,162
BALLOON ACTIVATED BY SOLAR ENERGY
Filed Feb. 24, 1965    2 Sheets-Sheet 1
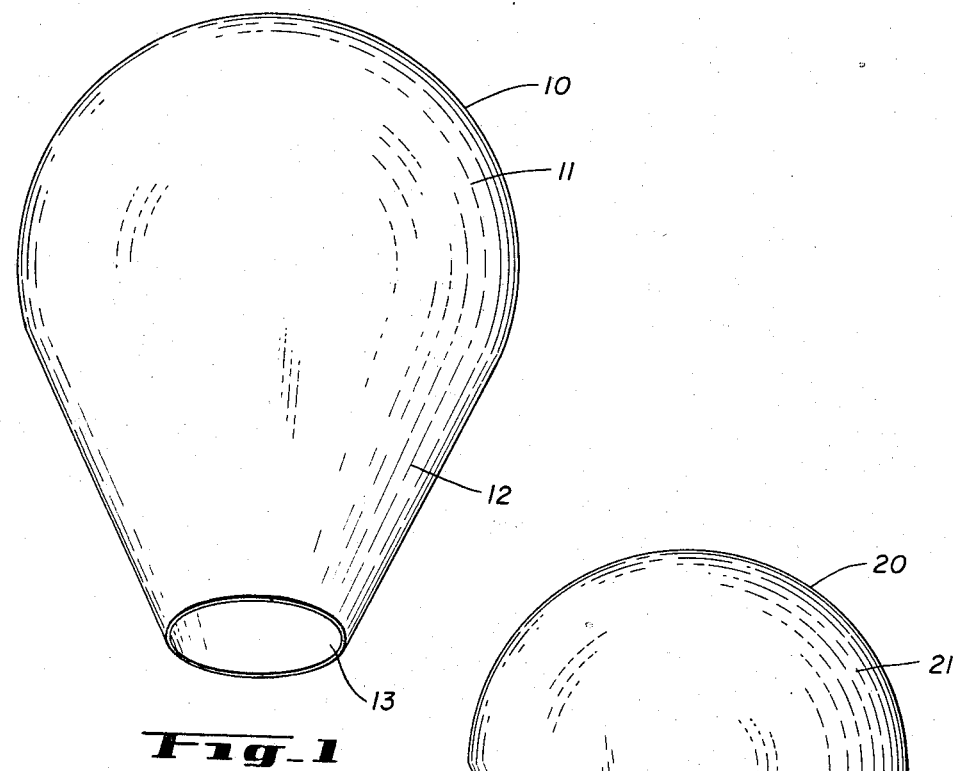
Fig_1
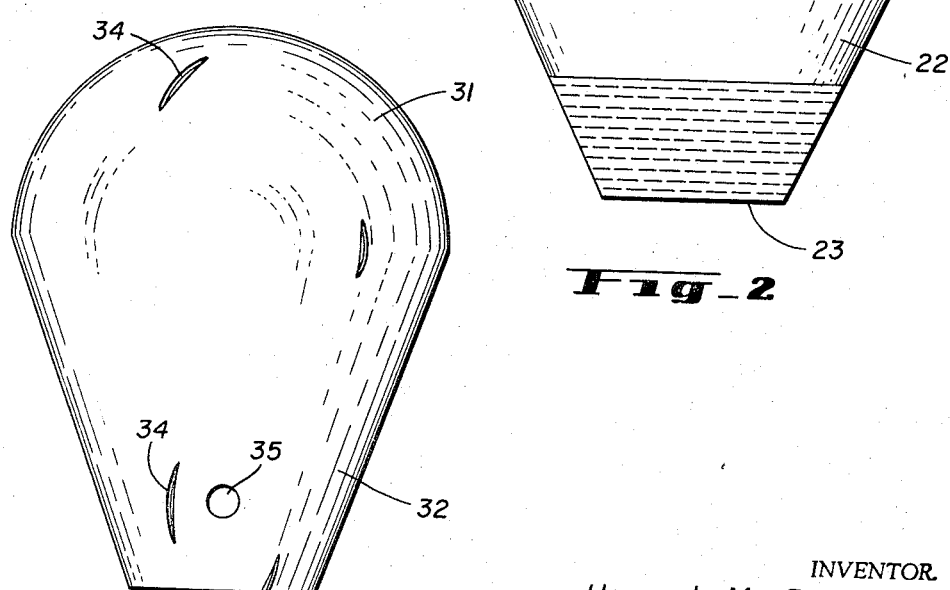
Fig_2
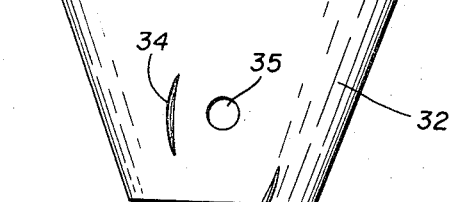
Fig_3
INVENTOR.
Howard M. Bauserman
BY
ATTORNEYS

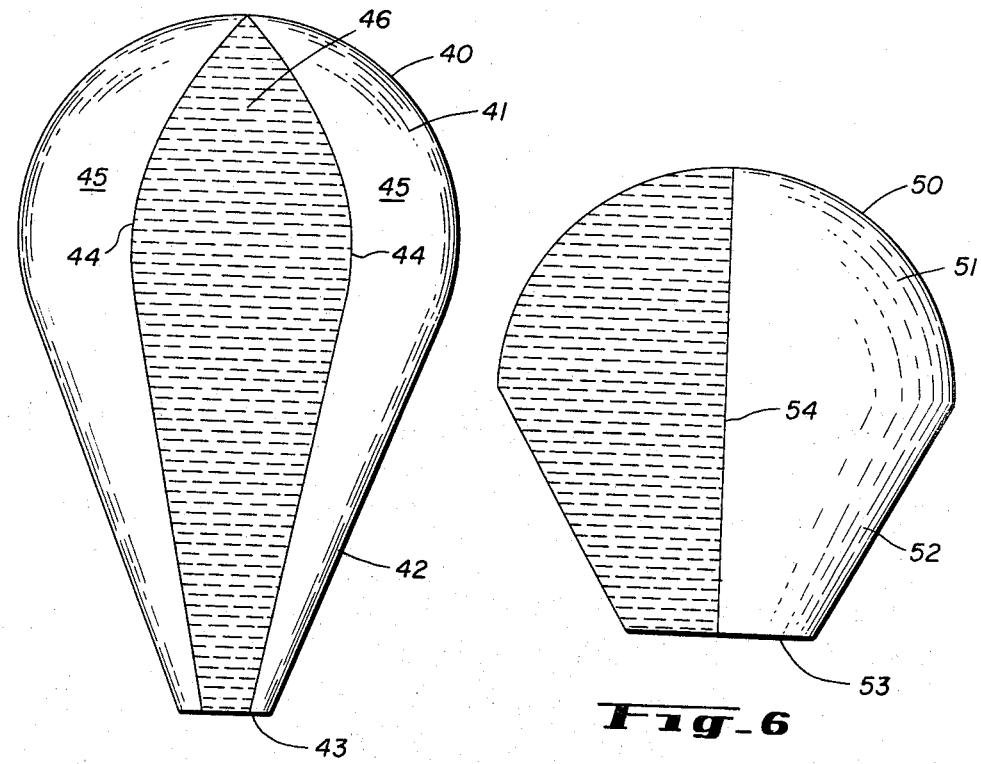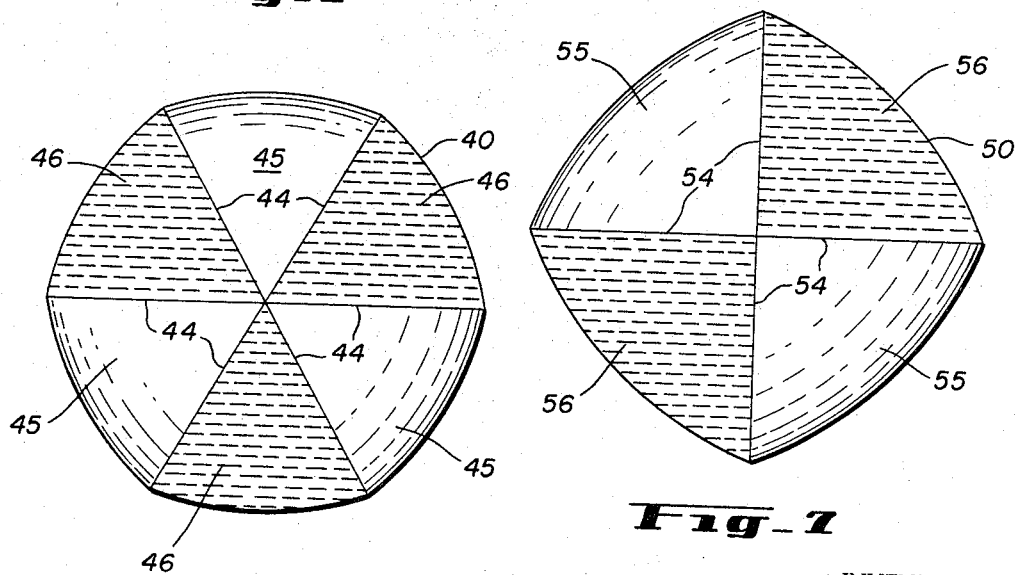

United States Patent Office

3,337,162
Patented Aug. 22, 1967

3,337,162
BALLOON ACTIVATED BY SOLAR ENERGY
Howard M. Bauserman, 821 Goorman Ave.,
Littleton, Colo. 80120
Filed Feb. 24, 1965, Ser. No. 434,948
9 Claims. (Cl. 244—31)

My invention relates to aerial devices, and more particularly relates to a type of balloon in which contained gas is warmed by solar rays to cause such device to ascend in the atmosphere.

Aeronautical engineers heretofore have worked toward minimizing the effects of solar radiation in balloons filled with lighter-than-air gases. Edwin P. Warner in his book "Aeronautics" says: "Since it is desirable . . . to keep the effect of solar radiation . . . to a minimum, the envelopes of airships are frequently coated with aluminum . . . and so diminish the temperature difference between the gas and air . . ."

The Federal Aviation Agency has been given the power to regulate uses of balloons within prescribed areas. Only balloons of more than 6 ft. diameter and more than 115 cubic feet of contents are regulated by that agency. Consequently, balloons of lesser diameter and content may be employed for a variety of uses. Among the many uses of balloons not regulated by the Federal Aviation Agency are the following:

(a) Toy or pleasure balloons,
(b) Balloons for meteorological investigations,
(c) Signalling devices for lost or stranded persons.

One of the advantages of solar-energized balloons of my invention in the non-regulated size category is that they do not require special filling and launching equipment and may be operated in sunlight when winds are not excessive, regardless of prevailing temperatures. They are lightweight, and can be packed in a small container for long periods of time and are easily transported. Such balloons do not require inflammable, noxious or expensive gases to provide the desired bouyancy, and can be inflated at the site of use by the simple expedient of placing the bottom opening in a forward position and drawing the container rapidly forward, preferably into the wind, until sufficient air enters the interior to expand the container for retention of a substantial volume of gas therein which can be heated to provide buoyancy.

The container of my invention has surfaces or portions adapted to selectively absorb solar radiation, and various arrangements of such surfaces have been provided to obtain maximum buoyancy. The container preferably is formed of flexible, non-elastic material and when contained gas is expanded, the container is extended or spread within its elastic limits, and continued heating thereafter exhausts excess gas through the bottom opening, which otherwise functions as an intake to supply any gas deficiency during the inflation.

After some period of time in sunlight, such as from five to ten minutes, the air in the balloon is warmed until the heat loss rate is substantially equal to the heat input rate. Tests with balloons utilizing the features of my invention, when held in direct sunlight will develop an inside gas temperature of from 95° to 120° F. or higher when the surounding air is about 70° F.

The basic lift theory of any balloon is that the lift is equal to the difference in weight of the volume of displacement ambient air and the combined weight of the balloon skin and containing gas. The greater the lift, the greater the load the balloon will support, or the more rapidly it will ascend. As the specific gravity of the balloon skin is much greater than air, it is necessary in lifting the balloon that the specific gravity of the contained gas be considerably less than the outside air at ambient temperature. The resultant specific gravity of the skin and contained gas will then be less than the specific gravity of the displaced ambient air. At sea level, for a given temperature rise, the effect on the specific gravity is greater than at higher elevations. At the same time, the available solar energy is greater at higher elevations than at sea level. The two effects thus tend to compensate until a balloon rises to such a height that the air becomes quite rarified as it approaches its design ceiling.

Most inflatable balloons employ an elastic skin or cover as the gas container and in order to inflate the balloon and cause it to ascend, a charge of lighter-than-air gas must be introduced into the container which is expanded, thereby stretching the elastic material and effecting the necessary specific gravity differential to cause the balloon to ascend. The balloons of the present invention utilize non-elastic material and a bottom opening so that the flexible material of the container is expanded only within its elastic limits, and thereafter any further expansion tendency is accommodated by gas interchange through the bottom opening.

It is an object of my invention to provide a simple, durable and efficient balloon which is caused to ascend by absorbing solar energy.

Another object of my invention is to provide an efficient, lightweight balloon which may be transported or stored in packed condition and which can be inflated and launched in sunlight within a short interval after exposure thereto and does not require special inflating and launching devices or gases.

A further object of my invention is to provide a lightweight balloon which can be stored in packed condition for long periods of time without impairing its efficiency and which can be launched in sunlight by persons without special training following a few simple directions.

Still another object of my invention is to provide a novel type of hot air balloon utilizing a novel film material in forming its skin or portions of same which is very lightweight and has a high capacity for absorbing solar energy.

Yet another object of my invention is to provide a novel type of hot air balloon containing media effective in directing and absorbing solar energy to increase temperatures within the balloon.

Other objects reside in novel combinations and arrangements of parts and in novel details of construction all of which will be set forth in the course of the following description.

The practice of my invention will be described with reference to the accompanying drawings, illustrating typical structural embodiments utilizing features of my invention. In the drawings, in the several views of which like parts bear similar reference numerals, FIG. 1 is a perspective view of a balloon according to my invention as it would appear in free flight;

FIG. 2 is a front or side elevation of another form of balloon according to my invention shown in inflated condition;

FIG. 3 is another front or side elevation of an inflated balloon utilizing features of my invention;

FIG. 4 is a still another front or side elevation of an inflated balloon according to my invention and comprising an integral assembly of six vertical panels;

FIG. 5 is a top plan view of the balloon shown in FIG. 4;

FIG. 6 is a front or side elevation of a balloon according to my invention and comprising an integral assembly of four vertical panels; and FIG. 7 is a top plan view of the balloon shown in FIG. 6.

As shown in FIG. 1, a balloon 10 comprising an upper hemisphere or spherical portion 11 and a lower conical portion 12 forming an integral skin or envelope has a lower or bottom opening 13, preferably disposed in a plane perpendicular to the vertical axis of the balloon. The geometric shape of the skin or envelope influences the location of the center of lift and also the location of the center of gravity. The center of lift must be directly over and some distance above the center of gravity for the balloon position to be stable in free flight.

While various materials may be used in forming the skin or envelope, I have found it advantageous to use relatively strong and tough films of polymerized plastics less than one mil (.001 inch) thick. In preferred practice a special polyethylene film is produced containing a dye or pigment giving the film a very dark gray color and the thickness is .00075 inch. A balloon fabricated from such film had a film surface of about 119 square feet, giving a total balloon weight of about 0.44 pound.

In use, the balloon 10 may be filled by grasping the opposite sides of the lower end of the balloon holding opening 13 facing the breeze. If the air is still the balloon may be drawn in a rapid scooping movement until it is sufficiently full of air to keep the envelope in an inflated condition. Then the material adjoining the opening is gathered to close said opening and confine the air in the envelope. After it has been held in sunlight with opening 13 closed for a period of perhaps five minutes the contained air will be warmed sufficiently to lift the balloon. With the neck still held in closed position, a gentle straight upward thrust is given the balloon which will elevate it about ten feet, and the continued warming of the contained air will enable it to continue its ascent.

Balloons of less than 6 feet diameter and 115 cubic feet of contents of the type just described have been launched at elevations of 5000 feet or higher and caused to ascend by solar heating to elevations above 6000 feet and in one experiment rose to an estimated 7500 feet elevation and then was lost. However, it is intended that larger balloons embodying features of my invention also will be utilized and flown under a license obtained from the Federal Aviation Agency under specified conditions.

Larger solar heated balloons of this invention are more easily designed, as the pay load increases as the volume is increased. It is preferable to produce the larger sizes with greater film strength and this can be accomplished by using skin films more than .001 inch thick. However, in all other respects the larger balloons will employ the structural features shown and described herein and the following description will apply to balloons of all sizes. In particular, the skins must be transparent or at least sufficiently translucent so that the interior of the balloon functions as a solar heat trap.

As the lift of the balloon is dependent on absorbing solar energy within the confines of the balloon, its ascent and buoyancy will be limited to sunlight periods and it will descend as soon as solar energy input is terminated. While the shaping shown in FIG. 1 is effective in maintaining a proper attitude for the balloon in free flight, when it is used as a toy or rescue signal it will be preferable to have a lightweight line attached for operation as a captive balloon so that it can be retrieved promptly as required.

Even though the balloon shown in FIG. 1 is designed for utilization of heating by solar energy, it may be used for emergency purposes as in rescue operations when sunlight is not available by filling with lighter-than-air gas and securely closing opening 13 to confine the gas charge. The volume to weight relationship provided for operation by solar energy is more than adequate for utilization of available lighter-than-air gases transported in pressure bottles or other suitable containers.

FIG. 2 illustrates another balloon construction. The balloon 20 of this embodiment has an upper hemispherical portion 21 formed of a clear film or a single layer of the gray film utilized in the FIG. 1 construction. The lower portion 22 is generally conical and is cut off on a circumferential line 23 defining a bottom opening similar to the opening 13 of FIG. 1. Lower portion 22 is made of heavier gauge gray film or several thicknesses of the thinner film of portion 21. The added weight at the bottom of balloon 20 increases its stability in free flight and insures proper attitude. Also, the combined films at the bottom attain an almost black effect with increased ability to absorb the solar energy input.

Under some circumstances and particularly when the balloon is to be operated as a toy or recreational device, it will be desirable to limit the lift capability to prevent rising to elevations providing too long a course of travel in free flight for effective recovery after descent. FIG. 3 illustrates an effective control arrangement in which the balloon 30 shaped similarly to the balloon 10 of FIG. 1 is provided with slits 34 or openings 35 which may be located in the upper portion 31 or the lower portion 32 as required. Upper slits or openings permit warmed gas to escape and be replaced by cool gas entering at the bottom which causes a heat exchange in the confined gas, maintaining temperatures lower than would be developed if the gas had no escape from the top. The number and location of the slits or openings provides a control on the rate of ascent and establishes an elevation limit for the ascent.

The embodiments of the balloons thus far described preferably are formed from a single sheet of material which will be joined along two or more edges as by heat sealing, adhesives or other suitable fastening procedures to provide the final three-dimensional shape. However, a series of panels may be formed to provide the desired shape, and such panels may be differentially colored, or have different degrees of transparency according to the intended uses of the balloon.

A panel-type construction has been employed in the balloon shown in FIGS. 4 and 5. The balloon 40 of this form has a globular upper portion 41 and an elongated lower conical portion 42 terminating in a rim portion 43 disposed in a plane perpendicular to the vertical axis and which defines a gas ingress and egress opening of the type previously described. The envelope is formed of a series of six panels joined by seams 44, and in a preferred arrangement alternate panels 45 will be produced from very lightweight clearer films adjoining more opaque, heavier films 46. By employing different dyes or pigments in the formation of the film, selective color combinations can be produced which may be employed as signal information, particularly when the balloon is intended for use in rescue operations.

The balloon 50 shown in FIGS. 6 and 7 also is a panel assembly and is shaped similarly to the balloon 20 shown in FIG. 2. It has an upper hemisphere portion 51 and a lower conical portion 52 terminating in an open end 53 providing the gas ingress and egress passage. Seams 54 secure adjoining panels which preferably are arranged alternately as cleaner film 55 and more opaque film 56. Also in this arrangement it is preferable to have plural layers of film in lower portion 52 to increase its capacity for absorbing solar radiation.

In my investigations with balloons of the type described hereinbefore, I have determined that the hotter the skin and contained gas of a balloon become, the more rapidly heat is lost through the skin until an equilibrium is reached. From my results, the heat transfer coefficient ranged from 0.95 to 1.10 B.t.u.'s per square foot per degree Fahrenheit per hour in quiet air. Various references report the total solar radiant energy (T.S.R.E.) falling on the earth's surface as sea level to range during a clear mild day, winter to summer, from 200 to 350 B.t.u./sq. ft./hour. My own determinations have given similar values ranging from 180 to 340 B.t.u./sq. ft./hour Air alone does not absorb the T.S.R.E. very well and it is preferable to absorb the energy with some solid which in turn heats the air by convection. Smoke, dust or water vapor in a gas absorbs part of the T.S.R.E. and in turn warms the gas. In testing several types and colors of plastic film and measuring T.S.R.E. absorption I have found that some films absorb as little as 50% and some as much as 95% of the normally incident T.S.R.E. One layer of the special dark gray film previously described absorbs about 50% of normal T.S.R.E. and from 60% to 80% of the T.S.R.E. is absorbed by a balloon made of such film. The greater total absorption by the balloon is the result of part of the energy being absorbed and heating, while unabsorbed rays passing through the balloon skin next to the sun then pass through the balloon and are absorbed, in part, by the portion of the film on the far side from the sun. Also, radiation from the sky augments the direct solar radiation by a small amount.

If desired, a balloon of the type shown in FIG. 1 or 2 may be formed of any suitable lightweight film regardless of its transparency and filled with a charge of smoke at the time of launching. The smoke functions as media having a much higher capability for absorption of solar energy than air, and after a brief heating interval in sunlight with the lower opening closed to confine all the smoke so introduced, the balloon may be launched in the manner previously described and will ascend readily in the atmosphere.

While I have described types of films which are effective in the practice of my invention, it should be understood that other compositions having corresponding properties may be used, particularly if they provide the weight to volume relationship recommended herein, and have a much higher capability for absorbing solar radiation than air. In addition, they must function as a solar heat trap and preferably the film will contain dye or pigment giving it a dark gray color. Other changes and modifications may be availed of within the scope of the invention as set forth in the hereunto appended claims.

I claim:

1. A balloon for activation during launch and sustained in flight by solar energy comprising a gas confining skin having a hemispherical upper portion and a conical lower portion formed of a thin translucent polymerized plastic film, at least substantial portions of said film being of a dark color in the film body and having a high capability of absorbing solar energy, said skin capable of absorbing above 60% of the total solar radiant energy produced by sunlight striking the skin, said skin confining the heat evolved from the radiant energy for heating the contained gas and thereby elevating the balloon, said solar energy providing the sole heat for the gas in the balloon during launch and in flight and the skin having a bottom opening formed by the lower extremities of the film and unobstructed throughout its circumferential extent for gas ingress and egress during flight.

2. A balloon for activation during launch and sustained in flight by solar energy comprising a gas confining skin having a hemispherical upper portion and a conical lower portion formed of a translucent polymerized plastic film not more than .001 inch thick, at least substantial portions of said film being of a dark gray color in the film body, said skin capable of absorbing about 60% to 80% of the total solar radiant energy produced by sunlight striking the skin, said skin confining the heat evolved from the radiant energy for heating the contained gas and thereby elevating the balloon, said solar energy providing the sole heat for the gas in the balloon during launch and in flight and the skin having a bottom opening formed by the lower extremities of the film and unobstructed throughout its circumferential extent for gas ingress and egress during flight.

3. A balloon as set forth in claim 1 wherein said film portions of a dark color are formed of a plurality of layers of said film.

4. A balloon as set forth in claim 1 wherein at least one portion of said skin is relatively clear and transparent.

5. A balloon as set forth in claim 1 wherein said hemispherical portion comprises a single thickness of said film and the conical portion comprises a plurality of thicknesses of said film.

6. A balloon as set forth in claim 1 wherein said conical lower portion is formed of a plurality of layers of polyethylene film of a dark gray color.

7. A balloon as set forth in claim 1 wherein said film is about .00075 inch thick.

8. A balloon as set forth in claim 1 wherein said skin comprises a plurality of panels arranged alternately and circumferentially of the balloon, at least one group of said panels being of a substantially clear film and another and alternating group of said panels being of a substantially dark gray color.

9. A balloon for activation during launch and sustained in flight by solar energy comprising a gas confining skin having a hemispherical upper portion and a conical lower portion formed of a translucent polymerized plastic film less than .001 inch thick and not in excess of .004 pound per square foot, at least substantial portions of said film being of a dark gray color in the film body, said skin capable of absorbing about 60% to 80% of the total solar radiant energy produced by sunlight striking the skin, said skin confining the evolved heat from the radiant energy for heating the contained gas and thereby elevating the balloon, said solar energy providing the sole heat for the gas in the balloon during launch and in flight, and the skin having a bottom opening formed by the lower extremities of the film and unobstructed throughout its circumferential extent for gas ingress and egress during flight.

References Cited

UNITED STATES PATENTS

| | | | |
|---|---|---|---|
| 1,866,079 | 7/1932 | Blondin | 244—31 |
| 2,960,282 | 11/1960 | Winzen | 244—31 |
| 3,153,878 | 10/1964 | Smith | 46—89 |
| 3,195,834 | 7/1965 | Huch | 244—31 |
| 3,220,671 | 11/1965 | Ashman et al. | 241—31 |

OTHER REFERENCES

Booda, L.: "USAF Balloon Achieves Endurance Mark," an article in the magazine, Aviation Week and Space Technology, p. 30, July 16, 1962.

MILTON BUCHLER, *Primary Examiner.*

T. MAJOR, *Assistant Examiner.*